No. 655,075. Patented July 31, 1900.
H. W. HALES.
ROLL HOLDING CAMERA.
(Application filed July 14, 1899.)

(No Model.) 3 Sheets—Sheet 1.

WITNESSES: INVENTOR
Alfred R. Krouse. Henry W. Hales.
C. B. Pitney. BY
Drake & Co.
ATTORNEYS

THE NORRIS PETERS CO., PHOTO-LITHO., WASHINGTON, D. C.

No. 655,075. Patented July 31, 1900.
H. W. HALES.
ROLL HOLDING CAMERA.
(Application filed July 14, 1899.)
(No Model.) 3 Sheets—Sheet 2.
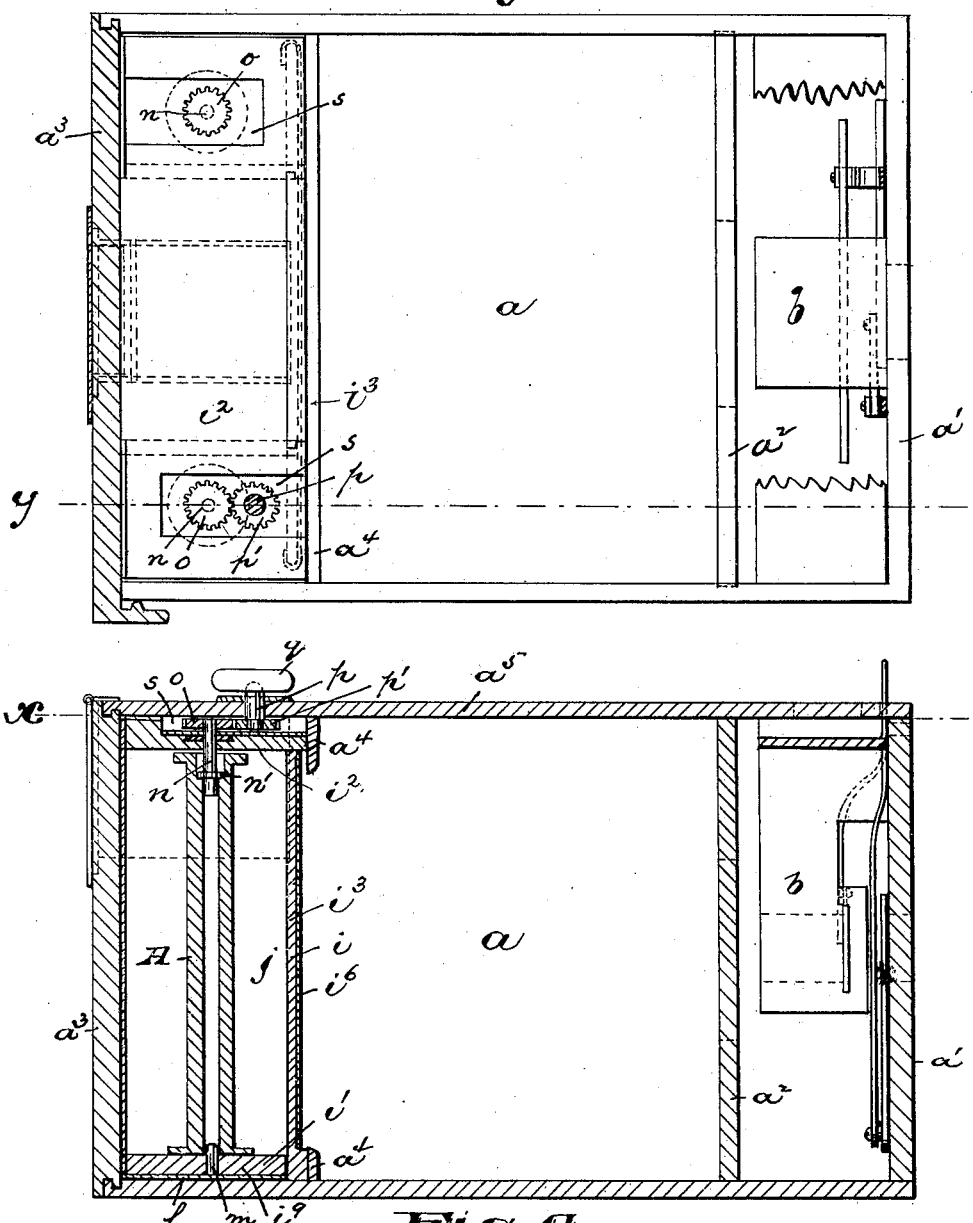

No. 655,075. Patented July 31, 1900.
H. W. HALES.
ROLL HOLDING CAMERA.
(Application filed July 14, 1899.)
(No Model.) 3 Sheets—Sheet 3.
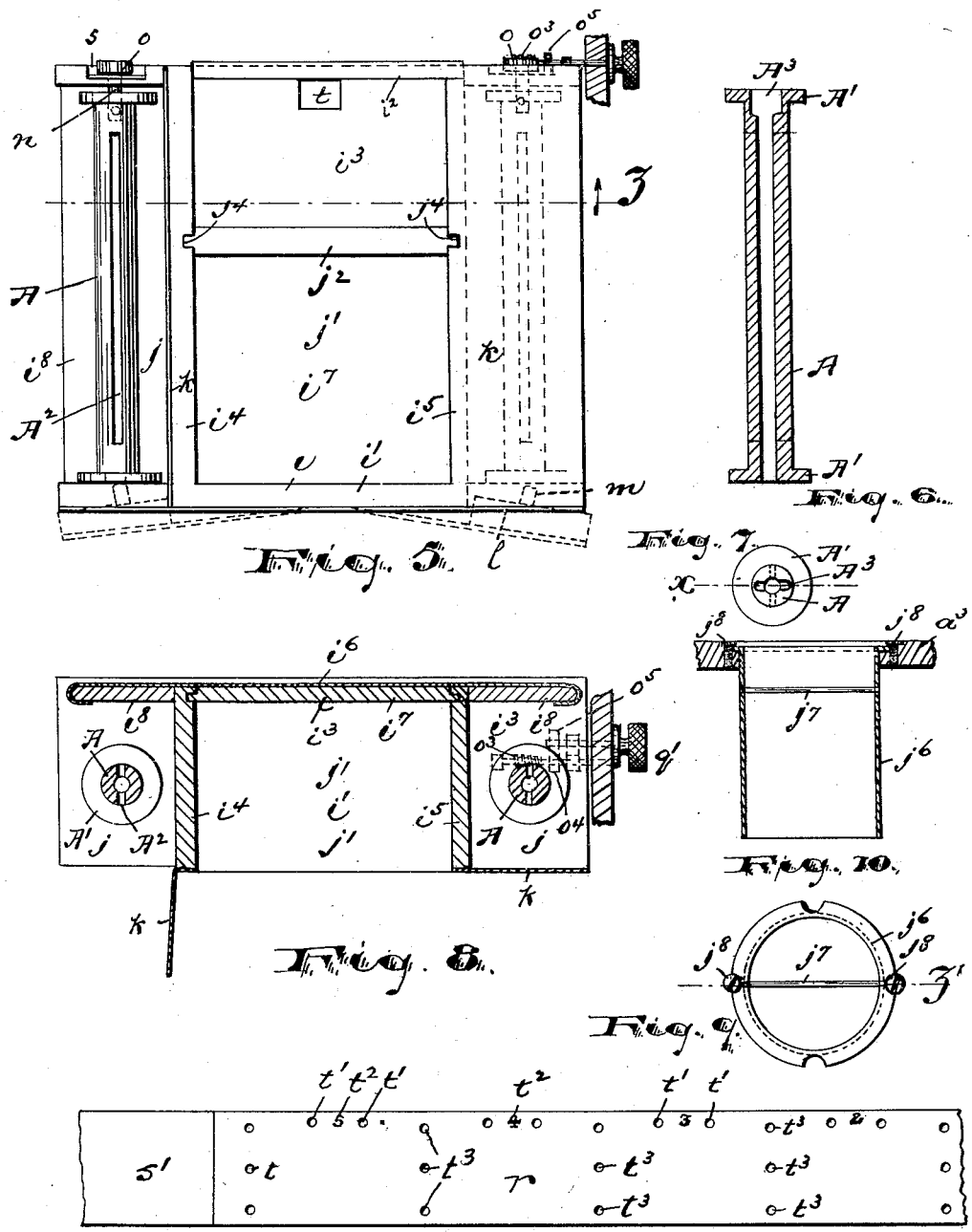
WITNESSES:
Alfred R. Krause
Russell M. Everett
INVENTOR
Henry W. Hales
BY
Drake
ATTORNEYS

UNITED STATES PATENT OFFICE.

HENRY W. HALES, OF RIDGEWOOD, NEW JERSEY.

ROLL-HOLDING CAMERA.

SPECIFICATION forming part of Letters Patent No. 655,075, dated July 31, 1900.

Application filed July 14, 1899. Serial No. 723,755. (No model.)

*To all whom it may concern:*

Be it known that I, HENRY W. HALES, a citizen of the United States, residing at Ridgewood, in the county of Passaic and State of New Jersey, have invented certain new and useful Improvements in Photographic Cameras; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to reduce the cost of construction; to enable the operation of loading to be performed more quickly and easily and with greater simplicity of action; to enable the rollable film to be wound back and forth without the necessity of entering a dark room should a film be wound off the pay-out spool upon the take-up spool by a mischievous person or by inadvertence, the film being rewound in the daylight within the camera without injury to the film; to secure a film of the rollable type which is of reduced cost of construction, one which can be more perfectly under the observation and control of the operator during the various operations of exposure, &c.; to provide a film that can be more perfectly, certainly, and quickly severed and divided into sections preliminary to development; to provide a film holder or frame which can be employed either in connection with a camera-box having a lens with a fixed focus or with a camera having a bellows in connection with the lens or one which can be employed in connection with any of the existing forms of cameras, and to secure other advantages and results, some of which may be referred to hereinafter in connection with the description of the working parts.

The invention consists in the improved camera and in the arrangements and combinations of parts of the same, all substantially as will be hereinafter set forth and finally embraced in the clauses of the claim.

Figure 1:
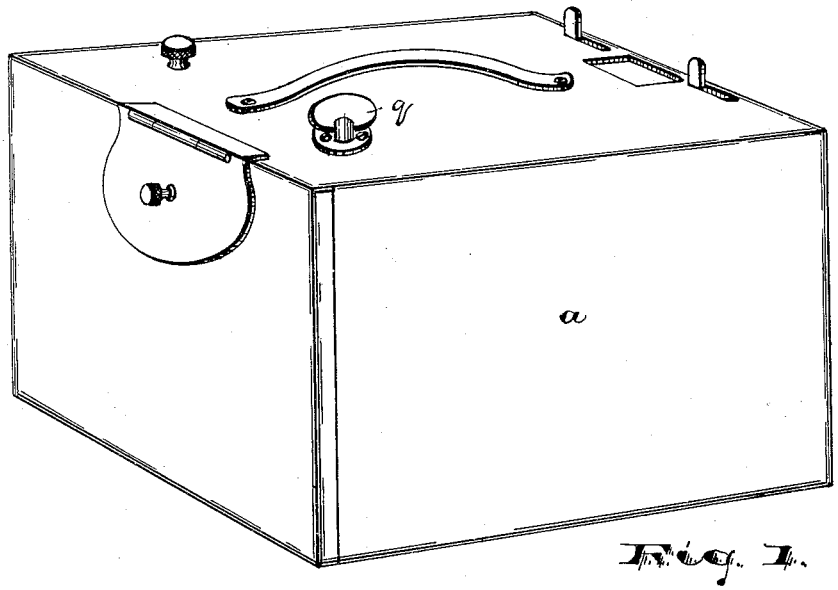
Figure 2:
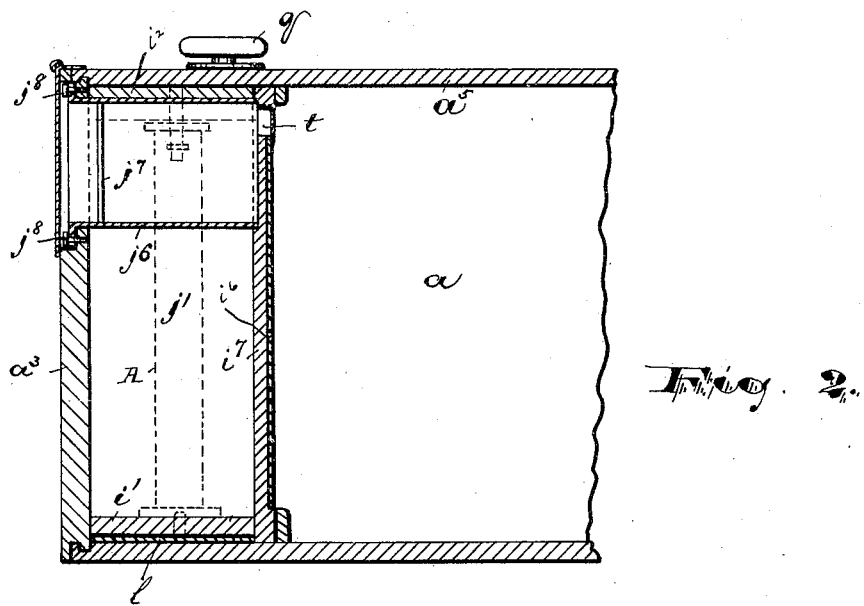

Referring to the accompanying drawings, in which like letters of reference indicate corresponding parts in each of the several views, Figure 1 is a perspective view of a portion of the improved camera. Fig. 2 is a vertical section of the back portion of the camera, taken through the axial center of a certain cylinder or tube employed in connection with a rear door of the camera and a spy-hole through which the film may be observed. Fig. 3 is a horizontal section of the improved camera, taken at line $x$, Fig. 4. Fig. 4 is a vertical section taken at line $y$, Fig. 3. Fig. 5 is a detail elevation of a film-carrying frame or holder. Fig. 6 is a longitudinal section of one of the spools for carrying the film. Fig. 7 is an end view of the said spool. Fig. 8 is a section of the film-carrying frame, taken at line $z$ of Fig. 5. Fig. 9 is a plan of a certain tube adapted to protect the film from the possibility of exposure to light under certain conditions, said tube embodying a modified form of construction which may be and sometimes is preferably employed. Fig. 10 is a section of the said tube on line $z'$, and Fig. 11 is a detail plan of a portion of the film of improved construction employed in connection with the camera.

In said drawings, $a$ indicates a box or case which may be of the fixed-focus type or may be of a folding type of any ordinary and approved form or construction.

$b$ indicates the lens tube or box of any ordinary construction, which may be attached to the front board $a'$ of the camera-box or to the partition $a^2$ within said camera-box.

At the back of the camera the same is open and provided with a sliding or hinged light-tight cover or door $a^3$, and in from said door an inch, more or less, I provide stops $a^4$, adapted to limit the insertion of the film-carrying frame.

Near the open rear end of the camera-box stops $a^4$ are inserted. These serve to limit the inward movement of a film-holding frame $i$. (Shown in detail more clearly in Figs. 5 and 8.) This frame consists, preferably, of bottom and top plates $i'$ $i^2$, a front board or boards $i^3$, and side boards $i^4$ $i^5$, the latter being secured to the front board and top and bottom boards in any suitable manner and being disposed a little in from the side extremities of the frame, as indicated in Fig. 8, so as to form chambers $j$ $j$ for the spools. The front board or boards form a platen or bearing for the flexible film and are preferably lined on the outer face with a soft fabric $i^6$, such as black velvet or similar light-absorbing material. The side extremities of the said fabric are turned around the side edges of the said front board $i^3$, so as to present a smooth surface to the film as it is bent thereover in the act of being transferred from the pay-out spool to the take-up spool.

The backs of the chambers $j$ or the sides opposite the front board or platen $i^3$ are preferably closed by doors $k$, of pasteboard or other material, hinged to said partitions $i^4 i^5$ by suitable flexible fabric fastened to the doors and to the end surfaces of the partitions by cement, glue, or otherwise. These doors may be hinged, however, in any suitable manner and may be made of other material than pasteboard—such as ebonite, black leather, thin wood, or other material.

The doors $k$ when open permit an easy access to the spools, so that the latter may be arranged on their pivotal bearings with greater facility, convenience, and ease preliminary to inserting the film within the camera-box.

I prefer to form the front board $i^3$ in sections, the middle section being in the form of a slide $i^7$ and removable from the end sections $i^8 i^8$ to permit the frame to be reversed in its relation to the camera, so that the light will pass to the film through the center chamber $j'$, formed between the partitions of the frame, by which means I am enabled to take a smaller picture than could be made at the front of the frame, conducing to economy of film in certain experimental work to be done preliminary to the regular picture-taking operations, the results of which are to be kept permanently.

When I reverse the frame, as described, it becomes desirable to change the focus of the lens, and to this end any ordinary means of adjusting the lens may be employed. The bottom board $i'$ is also preferably in sections joined together by a spring-plate $l$, the end sections $i^9$, of the chambers $j$, being movable in their relation to the middle section and carrying a pivotal pin $m$ or other suitable device for the spools. Said spring is a flat piece of resilient metal screwed to the center of the middle section and to the movable sections. By drawing down the movable sections, as indicated in dotted outline in Fig. 5, the said pivotal pins $m$ are withdrawn from the central or axial aperture of the spools, permitting the withdrawal of the said spools from their bearings.

The top boards or board or plate $i^2$ of the frame is provided with coöperating pivotal shafts $n$, which project beneath the top boards to receive the spools A and at their upper ends lie above said top boards or in a recess or recesses therein. Said shafts $n$ are provided with pinions $o$ $o$, adapted to intermesh one at a time with a pinion $p'$, Figs. 3 and 4, arranged on a shaft $p$ and having bearings in the top board $a^5$ of the camera-box, the said shaft $p$ having the said pinion at its lower extremity beneath the said top board and at its upper extremity having a finger-piece $q$, by means of which power is conveniently received from the hand to be transmitted to the take-up roll or spool.

The shaft $n$ is provided with a pin $n'$ or other suitable means adapted to prevent said shaft from turning within the spool or to cause the said spool to turn with the said shaft, so that by turning the finger-piece $q$ when the frame is inserted in the camera-box power will be transmitted from the shaft $p$ and its pinion $p'$ to the pinion $o$ on the frame and from thence to the shaft $n$ and spool, causing said spool to turn and wind up the film.

The recesses $s$ in the top board of the frame, in which the pinions $o$ are arranged, open oppositely, as indicated in Fig. 3, the recess of one pinion $o$ opening toward the rear of the frame and the opposite recess opening toward the front of the frame, and thus by reversing the frame the recess opening rearward is changed to open forwardly and is thus adapted to receive the pinion $p$, the opposite recesses being thus each in turn adapted to receive the one pinion of the camera-box, all as will be understood.

In order to obtain a smaller chamber $j'$ between the partitions or plates $a^4 a^5$ of the frame, and thus one which can be more easily made light-proof, I have provided a transverse partition $j^2$, as shown in Fig. 5, and around the rear edges of the said chamber, formed by said partition $j^2$ and the partitions $i' i^4 i^5$, I have applied a lining of velvet or similar absorbent of light and cushion-like material, adapted to press against the rear plate or back cover $a^3$ of the camera-box to prevent an inpassage of light. This partition $j^2$ is preferably arranged in slideways or grooves $j^4$ in the partitions $i^4 i^5$, from which it may be withdrawn in the reversing operations heretofore referred to.

The front plate or platen $i^3$ of the frame is provided with a spy-hole $t$, suitably covered with a pane of ruby glass or other transparent non-actinic material, over which the film passes in its progress from the pay-out to the take-up roll, and through the said spy-hole and transparent pane certain figures or characters upon the film can be seen, by which the operator may know the location of the film with respect to its rollers, the platen, and the lens. A portion of the film employed is shown in Fig. 11, in which $r$ indicates the transparent celluloidal portion of the film carrying the sensitive emulsion, and $s'$ is one of the end portions of non-actinic paper cemented or otherwise attached to said body portion. Close to one of the longitudinal edges of the sensitive body portion of the film I have provided a series of indication-marks $t'$, preferably perforations, as distinguished from a mere printing or stenciling of the indication-marks upon the film. These are arranged in pairs, with printed numbers or characters $t^2$ between.

The film is divided into a series of divisions, each division corresponding with the length of the platen or front plate by perforating the film transversely in series, as at $t^3$, the perforations being formed preliminary to the winding of the film upon the roll or spools. The indication-marks at one side of the film are adapted to come into coincidence with the spy-hole when the division is properly at the front of the platen, ready for exposure.

The signaling-holes $t'$ $t'$ are adapted to warn the operator as he forwards the film of the arrival of the indicating-marks $t^2$ at the spy-hole, so that he can slow up the moving film when the warning perforation first arrives into view, and thus all chance of his unduly forwarding the film past the proper relation to the platen will be prevented.

A sensitive or non-actinic paper is fastened at the opposite ends of the body portion $r$ of the film to properly cover the said body portion when on the roller or spool, and thus permit of the spool being removed from the camera in the daylight without danger of fogging or otherwise injuring the same.

The spool A employed is preferably of the construction shown in Figs. 6 and 7, comprising a simple piece of wood of spool shape having integral flanges A' A' at its opposite ends and intermediate of said flanges slotted longitudinally, as at $A^2$. (Shown in Figs. 5 and 8.) The end of the paper $s'$ on the film is simply inserted through the slot and the spool is wound, the slot serving to prevent the paper from turning on the spool in the winding operation and yet permitting an easy and free withdrawal of the film from the spool when the winding operation is completed. At one end the spool is slotted, as at $A^3$, Figs. 6 and 7, or provided with an aperture adapted to fit the cross-pin $n'$ of the shaft $n$, so that there will be no danger of independent moving of the spool with relation to the said shaft. I may employ, in connection with the pinion $o$, a worm-wheel arranged as indicated in outline in Fig. 8. In this case to secure the desired rapidity of motion I employ on the shaft with the worm-wheel $o^3$ a small pinion $o^4$, adapted to mesh with a larger pinion or gear-wheel $o^5$ on the shaft with the finger-nut. Thus by turning the milled finger-piece $q'$ the motion is transmitted from the larger gear-wheel or pinion on the shaft or shank of said finger-piece to the smaller pinion $o^4$, and thus to the worm-wheel $o^3$ and cog-wheel $o$.

To secure a more contracted light-chamber and to avoid the use of the partition $j^2$, I may employ, in connection with the spy-hole $t$, a hollow cylinder or tube $j^6$. (Shown in Figs. 9 and 10.) The said hollow tube is preferably provided with a flanged head and interiorly with a cross-wire $j^7$, arranged near enough to the outer end of the said tube to permit of it being grasped by the fingers. The flange of the said tube is notched to receive holding-screws and permit of an easy removal when necessary. The said flanged tube is arranged within a perforation in a door $a^3$ of the camera opposite the spy-hole $t$ and is adapted to be turned therein. The holding-screws or catches $j^8$ are arranged near the peripheral edges, the head of which overlap the said flange, and the said notches are at opposite sides of the flange to coincide with said screws or catches. When the flanged tube is in the position shown in Fig. 9 with reference to the said screw-head, the said tube is held firmly in place upon the cover $a^3$, but by turning the said tube and bringing the screw-head into coincidence with the notches the said tube may be withdrawn to permit an outsliding of the cover. The said tube $j^6$ is arranged with reference to the spy-hole, so that the film may be clearly viewed through the latter from the outside of the camera without danger of actinic rays of light gaining entrance to the film.

The formation of the perforated indicating-marks of the film is such that the black background to the perforations formed by the stop $a^4$ at the top of the box or other black wall or partition will be in strong contrast with the yellow color of the sensitive film. The indicating-perforations will then make a strongly-contrasting indication-mark clearly apparent through the ruby-colored diaphragm or pane.

While I have described the foregoing construction of parts in positive terms, I am aware that various modifications and changes of construction may be employed without departing from the spirit and scope of the invention, and therefore I do not wish to be understood as limiting myself by the positive descriptive terms employed, excepting as the state of the art may require.

Having thus described the invention, what I claim as new is—

1. In a camera, the combination with the box $a$, open at the back and having stops $a^4$, of the film-holding frame $i$, removably inserted in the open end of said box and comprising top and bottom plates $i'$, $i^2$, a front board $i^3$, serving as a platen and vertical side boards $i^4$, $i^5$, the latter being disposed a little in from the opposite sides of the frame, and forming chambers $j, j$, hinged doors $k, k$, closing the rear of said chambers and means in said chambers for holding the spools, substantially as set forth.

2. The improved camera comprising the box or case $a$, and a film-holding frame $i$, removable from said box or case and consisting of bottom and top plates $i'$, $i^2$, one of which is in sections, connected by a spring, a front board serving as a platen, vertical side boards $i^4$, $i^5$, the latter being disposed a little in from the opposite sides of the frame and forming chambers $j, j$, hinged doors $k, k$, closing the rear of said chambers and means in said chambers for holding the film-spools, substantially as set forth.

3. In a camera, the combination with the box, $a$, open at the back and having a door for closing said opening, of a film-holding frame $i$, removably inserted in the open end of the box, and comprising bottom and top plates vertical boards disposed a little in from the sides of the frame, a platen, the center part of which is removable and provided with a sight-opening, substantially as set forth.

4. In combination with the box or case having a lens, of a frame comprising top and bottom plates, a front board and side boards, the latter being secured to the front board and side boards a little in from the lateral extremities to form spool-chambers, the front board forming a platen over which the film may travel and being in sections, the central section being removable, doors $k$, $k$, closing the backs of said chambers, the said frame being reversible to enable a small picture to be taken on the film through the opening provided by the removal of the central platen-section or in front of the complete platen, and means for operating the film and spools, substantially as set forth.

5. In combination with the box or case having spool-operating means and a lens, of a reversible spool-carrying frame having a sectional platen, the central section of which is removable to permit a picture to be taken through the aperture formed by the removal of said central section, substantially as set forth.

6. In combination with the box or case having spool-operating appliances, of a reversible frame, having spool-chambers and a light-passage between said spool-chambers whereby large pictures may be taken on the film lying at the front of the frame or small pictures through the opening between the chambers on the film lying back of said frame, substantially as set forth.

7. The combination with the box or case having spool-operating appliances of a reversible frame having spool-chambers and a light-passage between said spool-chambers, and means for closing said passage, substantially as set forth.

8. The combination with the box or case having spool-operating appliances and at the back a spy-hole, of a frame having spool-chambers at opposite sides and a perforated platen at the front over which the flexible film is adapted to travel from one spool to another, a tube extending from the perforation in the platen to the spy-hole, and a pane of transparent material preventing the passage of actinic-light rays, all arranged and adapted to operate substantially as set forth.

9. The combination with the box or case having spool-operating appliances including a cog-wheel, of a reversible frame having spool-chambers and axial supports for the spools on or with which the spools rotate, said axial supports being each provided with cogs adapted to intermesh with the cog-wheel first referred to, one when the frame is in its obverse position and the other when in reverse position, whereby the spools may be operated by the one finger appliance when the frame is in either of its positions in the case, substantially as set forth.

10. The combination with the box or case having spool-operating appliances, including a cog-wheel disposed within said box and a finger-piece outside thereof, of a reversible frame having spool-chambers at opposite ends, pivotal shafts $n$, adapted to receive the spools at the inside of said chambers and having pinions $p'$, each adapted to enter into engagement with the cog-wheel, substantially as set forth.

11. The combination with the box or case having spool-operating appliances operable from the outside of the camera and adapted to enter into coöperating connection with spool-operating appliances on the spool-holding frame, of said spool-holding frame having spool-chambers at opposite sides and each having said coöperating spool-operating appliances either of which is adapted to enter into connection with the appliances on the box or case, and a removable central section adapted to close the light-passage between said spool-chambers or be opened to open said light-passage, substantially as set forth.

12. The combination with the box or case having spool-operating appliances operable from the outside of the camera and adapted to enter into coöperating connection with the spool-operating appliances on the spool-holding frame, of said spool-holding frame having spool-chambers at opposite sides and appliances to connect with those of the case, of doors closing one side of each of said chambers adapted to be opened to facilitate the removal of the spools, substantially as set forth.

13. In a camera, the combination with the case having a wall or partition against which the film may lie in its passage from one spool to the other, of a spool-holding frame having spool-chambers and between said chambers, a spy-hole covered by transparent matter impervious to actinic-light rays, the wall or partition being of a color strongly in contrast to the color of the film whereby the letter or numbers formed by the perforation of the film will be strongly outlined to the eye as the said perforated letter or number passes across the spy-hole substantially as set forth.

In testimony that I claim the foregoing I have hereunto set my hand this 29th day of May, 1899.

HENRY W. HALES.

Witnesses:
CHARLES H. PELL,
RUSSELL M. EVERETT.